United States Patent [19]

Gordin et al.

[11] Patent Number: 5,207,747
[45] Date of Patent: May 4, 1993

[54] MOBILE LIGHTING SYSTEM

[75] Inventors: Myron K. Gordin; Robert D. Jones; George P. Glass; David M. Crookham; all of Oskaloosa, Bradley M. Chelesvig, Des Moines; James A. Whitson, all of Iowa

[73] Assignee: Musco Corporation, Oskaloosa, Iowa

[21] Appl. No.: 685,296

[22] Filed: Apr. 12, 1991

[51] Int. Cl.$^5$ .................................................. F21M 1/00
[52] U.S. Cl. ........................................ 362/233; 362/66; 362/250; 362/264; 362/265; 362/294; 362/386
[58] Field of Search ....................... 362/61, 66, 70, 233, 362/239, 249, 250, 263, 264, 265, 271, 275, 276, 285, 294, 373, 386, 419, 427, 431, 802

[56] References Cited

U.S. PATENT DOCUMENTS

| Re. 30,000 | 5/1979 | Loffler et al. | 362/233 |
|---|---|---|---|
| 1,313,739 | 8/1919 | Ryerson | 362/427 X |
| 1,512,158 | 10/1924 | Bragg et al. | 362/61 X |
| 2,109,056 | 2/1933 | Bardwell et al. | 240/41.3 |
| 2,295,031 | 9/1942 | Davis | 240/11.4 |
| 2,510,892 | 6/1950 | Kennelly | 362/273 X |
| 2,663,792 | 12/1953 | Gretener | 362/373 |
| 2,750,155 | 6/1956 | Nixon | 255/51 |
| 2,819,385 | 1/1958 | Smith | 362/272 X |
| 2,911,518 | 11/1959 | Anderson | 362/269 X |
| 3,049,615 | 8/1962 | Sawyer | 362/272 X |
| 3,656,287 | 4/1972 | Morrison et al. | 56/328 TS |
| 3,703,635 | 11/1972 | Burkarth | 362/264 X |
| 3,720,822 | 3/1973 | Rochester et al. | 362/264 X |
| 3,758,769 | 9/1973 | Pichel | 240/41 R |
| 3,949,218 | 4/1976 | Hayward | 362/233 |
| 3,957,124 | 5/1976 | Desourdy | 173/28 |
| 3,982,715 | 9/1976 | Lindgren et al. | 248/2 |
| 4,072,856 | 2/1978 | Eligehausen | 362/2 |
| 4,190,117 | 2/1980 | MacLean | 173/43 |
| 4,220,981 | 9/1980 | Koether | 362/61 |
| 4,229,781 | 10/1980 | Hitora | 362/274 |
| 4,234,914 | 11/1980 | Boesen | 362/240 |
| 4,264,051 | 4/1981 | Walmsley et al. | 248/660 |
| 4,298,911 | 11/1981 | Headrick | 362/35 |
| 4,392,187 | 7/1983 | Bornhorst | 362/233 |
| 4,423,469 | 12/1983 | Zerlaut et al. | 362/2 |
| 4,423,471 | 12/1983 | Gordin et al. | 362/96 |
| 4,450,507 | 5/1984 | Gordin | 362/61 |
| 4,598,345 | 7/1986 | Kleeman | 362/233 |
| 4,602,321 | 7/1986 | Bornhorst | 362/268 |
| 4,712,167 | 12/1987 | Gordin et al. | 362/233 |
| 4,729,077 | 3/1988 | Gordin et al. | 362/285 |
| 4,779,168 | 10/1988 | Montgomery | 362/66 |

FOREIGN PATENT DOCUMENTS 16225 of 1912 United Kingdom.
395017 7/1933 United Kingdom.

*Primary Examiner*—Stephen F. Husar
*Attorney, Agent, or Firm*—Zarley, McKee, Thomte, Voorhees & Sease

[57] ABSTRACT

A mobile lighting system includes a self-powered mobile base that can be driven long distances and maneuvered in tight locations. An articulateable boom is mounted on the base and has multiple degrees of freedom of movement. A light array is attached to the end of the boom and has additional degrees of freedom of movement. One or more fixtures are mounted on the end of the boom and also have several degrees of freedom of movement, as well as having structure to vary the beam pattern output from each fixture. The system contains power generating means as well as all structure to operate the lights and the boom. Additional features which facilitate the efficient and advantageous provision of the mobile lighting system are also disclosed.

38 Claims, 9 Drawing Sheets

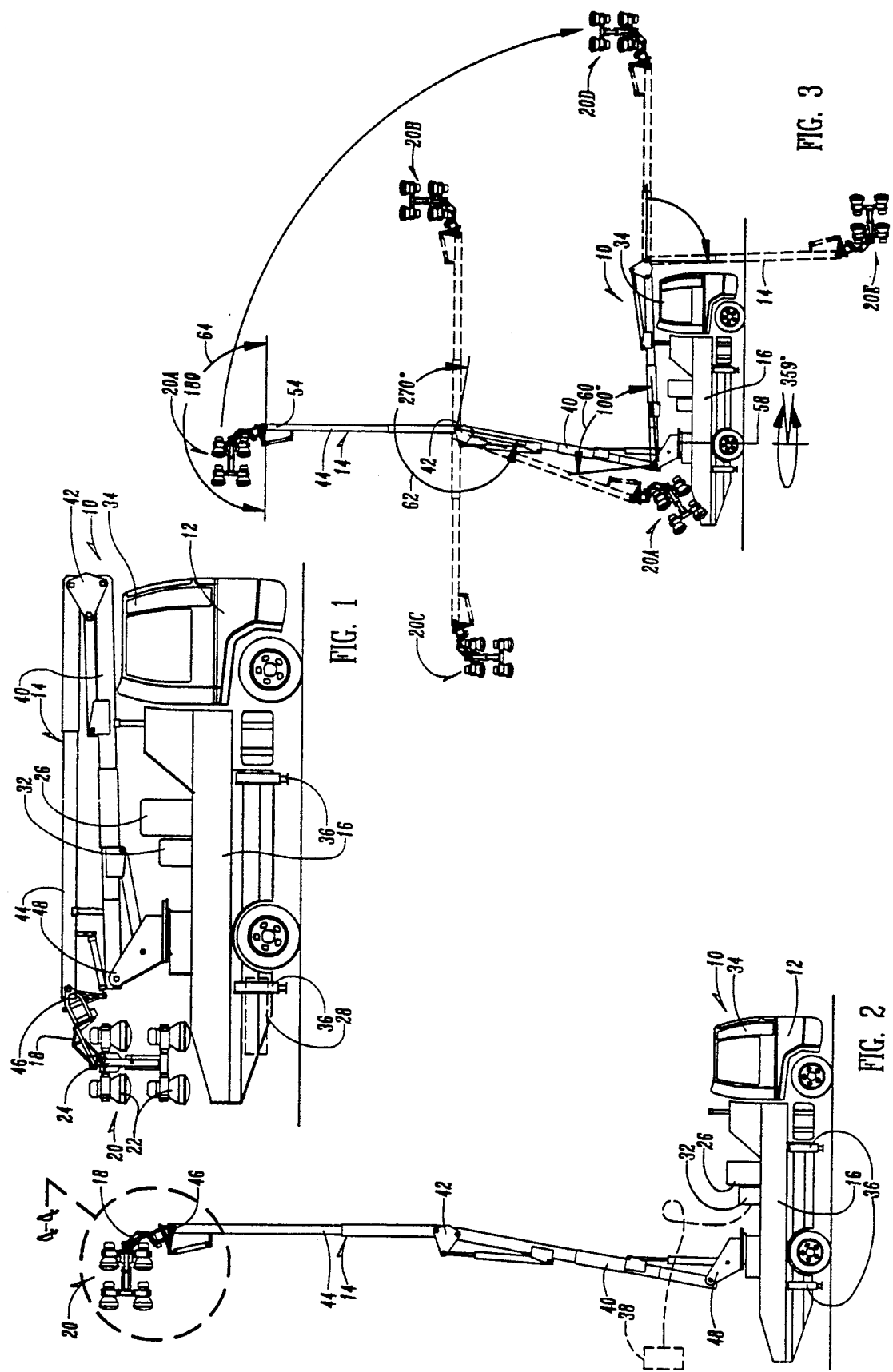

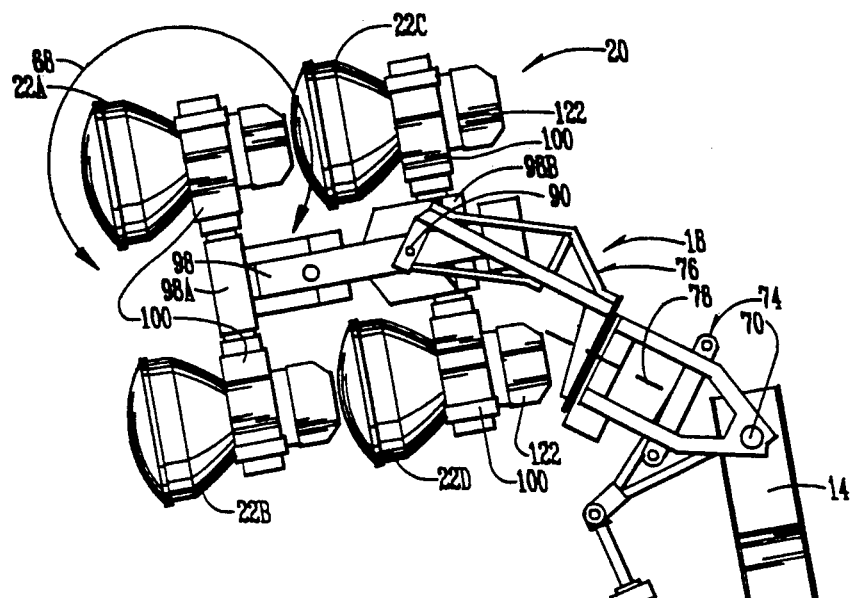
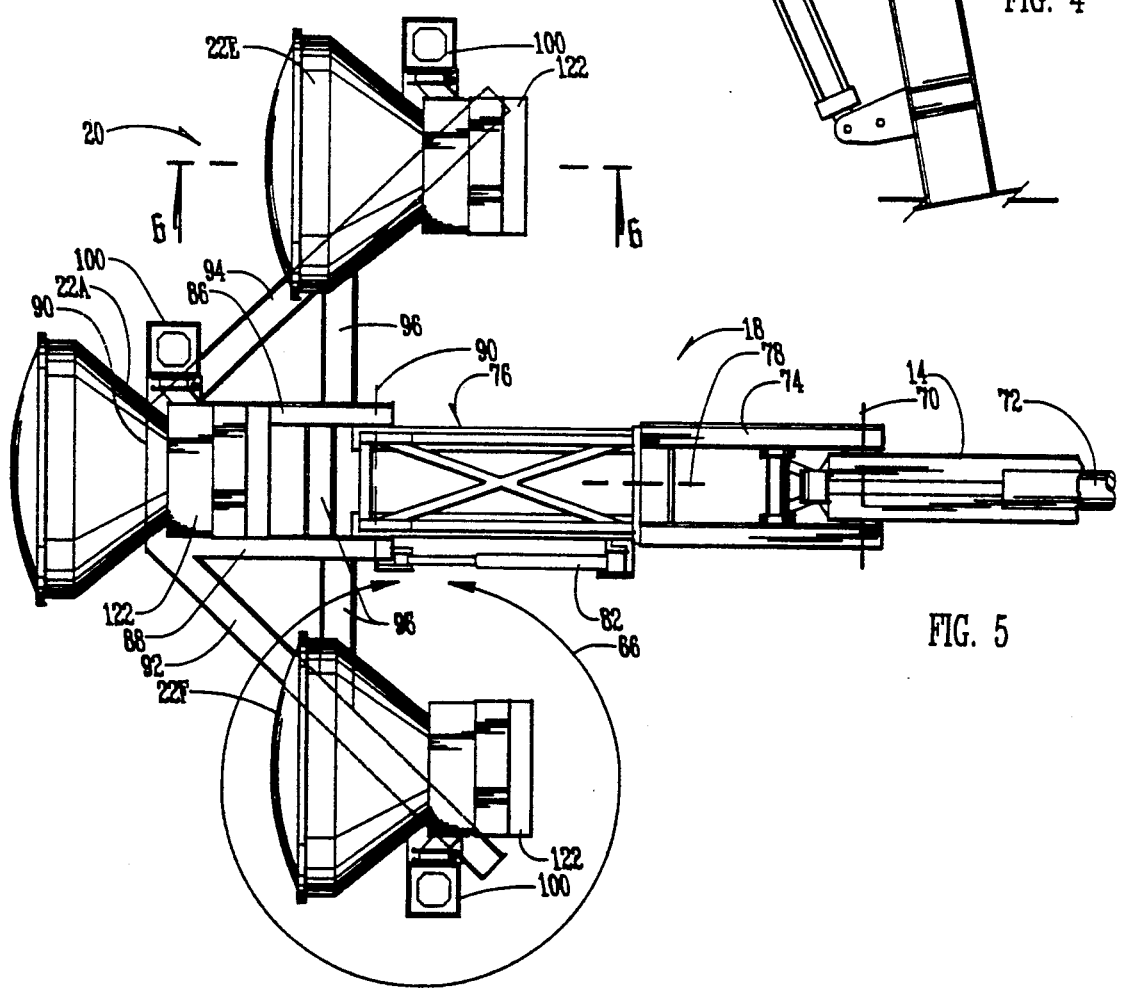

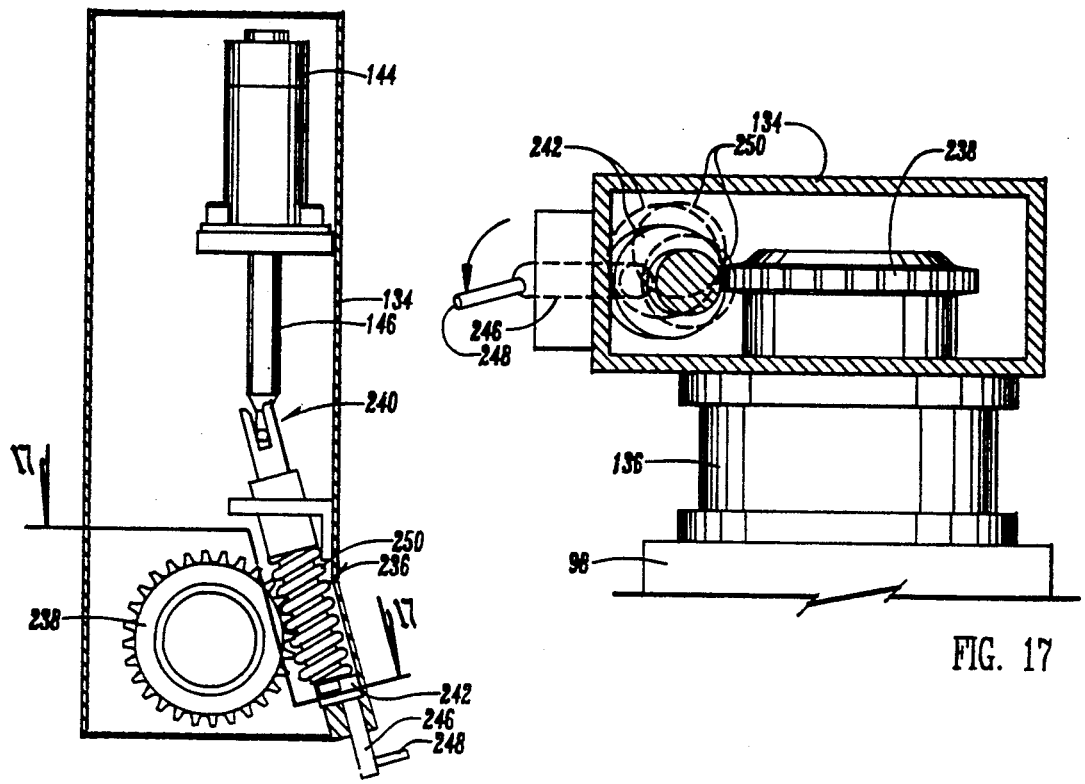
FIG. 17
FIG. 16
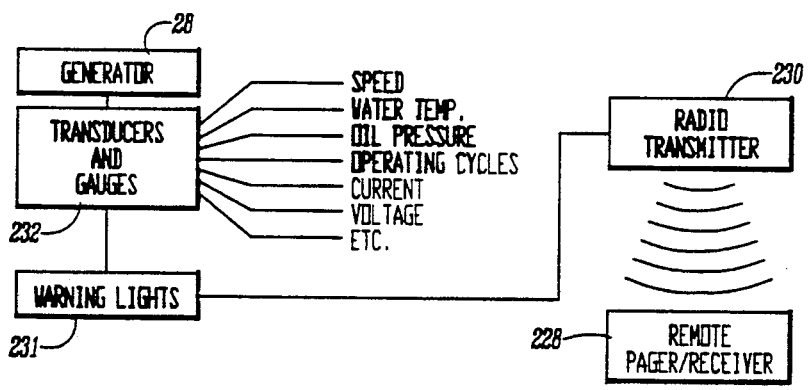
FIG. 23
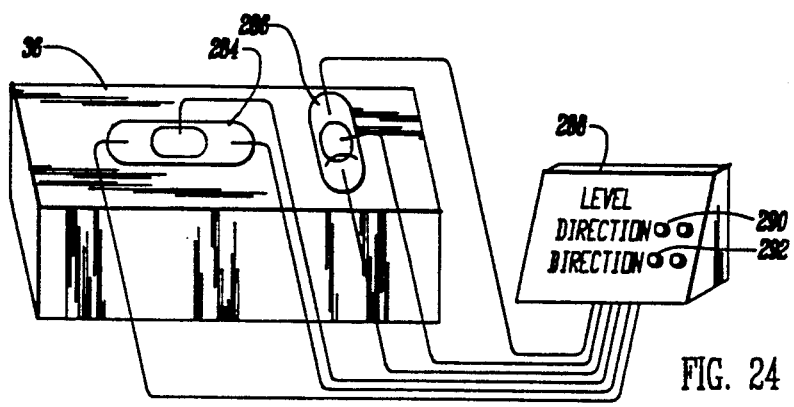
FIG. 24

MOBILE LIGHTING SYSTEM

BACKGROUND OF THE INVENTION a. Field of the Invention

The present invention relates to a means and method of temporarily lighting relatively large areas, and inparticular, to a means and methods for providing controlled and variable temporary lighting.

b. Problems in the Art

A wide variety of events occur which need temporary lighting. For example, movie scenes being shot at locations remote from a sound stage usually require supplementary light, even in daytime hours. As another example, on-the-spot television news reports at night could use powerful, wide scale lighting. Still further, certain special events, whether at day or at night, may need this type of lighting, but cannot justify installation of permanent lighting.

A conventional way of meeting these needs is utilization of whatever portable or semipermanent lighting is available. This can be in the form of temporary light poles or towers to which are fixed one or more light fixtures. This type of temporary lighting requires substantial personnel and equipment to both erect and disassemble the structures. Also, it is usually somewhat difficult to adjust the aim of the fixture or fixtures once erected on the structures. While this method does allow elevation of several high powered, wide area lighting fixtures, it takes a lot of time simply to get these lights constructed and operational. Once done, they are difficult to reposition and adjust. A worker must physically climb or use a mechanical lift to move to the top of the boom to adjust the lights.

With movie making, such a system is limiting because of the amount of time needed and the high cost of construction in remote shoots. It does not give the lighting director much flexibility once erected. Such systems also lack precision and control. To adjust the lights requires more equipment and expense.

This type of method is generally unacceptable for transient activities such as news reporting. The event has come and gone before any such lights can be constructed. The cost of such construction is also generally prohibitive.

Special events usually provide more time to set up lighting. However, again, the time and labor required is substantial and leaves room for more economical solutions.

If some sort of semipermanent or fixed structures are not used, reliance generally must be placed on more portable lighting fixtures which are much smaller and put out much less light. For example, fixtures can be put on small portable stands or secured to cameras or the like. Such lights are limited in the amount of light output they can create and the ability to control the created light; and therefore, are limited as to the area they can cover.

Room therefore exists in the art for a lighting system which can meet these types of needs. Attempts have been made to satisfy these needs. U.S. Pat. No. 4,712,167, issued to inventors Gordin and Drost, entitled REMOTE CONTROL, MOVABLE LIGHTING SYSTEM, illustrates one such attempt. A large tractor truck carries a crane which can raise and somewhat articulate an array of light fixtures. An on-board generator and associated electronics allows operation of the crane and provides a variety of controls for the aiming of and beam pattern issued by each fixture in the array. The truck and crane can therefore be loaded with the light fixtures, driven to a required location, and have all components necessary to relatively quickly connect the fixtures into an array, and then erect the array of fixtures and power those fixtures.

A primary example of the use of such a system is with respect to special events such as night time football games. Several of the trucks can be positioned spaced around the outside of a football stadium. The crane can erect the fixtures tens of feet in the air so that the light is projectable onto the playing surface over the walls of the stadium. To accomplish this, each of the fixtures has to be a high power highly efficient light unit that, when combined with all the fixtures, can produce the type of light to cover such a wide area, and maintain the high level of light needed for television to produce an adequate picture.

U.S. Pat. No. 4,712,167 is incorporated by reference herein. It discusses in detail how a lighting system that can cover a relatively wide area can at the same time be fairly mobile, and then very flexible. It allows both substantial and subtle control of lighting, either compositely for the entire light array, or with respect to groups of or individual fixtures.

Others have attempted to meet the needs expressed above by utilizing a crane to simply suspend one or more light fixtures. Those methods are deficient in that while they do allow some mobility, as well as the ability to elevate high powered lights to substantial heights, there is a significant absence of control of fixture aiming or of beam pattern once erected and elevated. Most of the systems also are not self-contained, in the sense that they require an auxiliary power source that is not on board.

The system of U.S. Pat. No. 4,712,167, therefore represented a significant advance in the art. However, there are still matters which can be improved upon, and problems which have not been adequately solved.

For example, improvement in the set up speed, mobility and flexibility of such a system is needed. A movie director may desire to shoot a scene on a crowded big city street. A light source may be required to be set up, moved and tested in various locations and orientations until it is found acceptable. Large semi-truck tractor vehicles may not have sufficient maneuverability. Additionally, they simply may not be able to be driven to a desired location. In such situations, the large temporary lighting support structures are probably out of the question. The hourly cost of shooting movies is anywhere from thousands of dollars to tens of thousands of dollars. Therefore, the ability to quickly and efficiently adjust lighting, as well as control lighting output, can represent significant money savings.

There is need also for improvement in how much positioning control is available once a mobile platform is in place. Conventional crane assemblies allow the crane arm to be extended substantially, as well as some movement of the arm angularly and rotationally. However, the crane generally is for elevating an item, and has limitations as to orientations and degree of articulation.

Still further, room for improvement exists as to how quickly lighting can be set up in operative condition. The need exists for an absolute minimum amount of construction or setup steps once on sight, to minimize the amount of time to bring the lights into position to operate. This need can easily be envisioned with respect to an emergency situation, or a fleeting news event.

Additional room for improvement exists with respect to a system such as disclosed in the U.S. Pat. No. 4,712,167. More flexibility with respect to the adjustment and control of individual fixtures is desirable. More comprehensive control of all the components, including electrical components, of the system is desirable.

Still further, an important aspect of such a system is the ability to transport it without requiring substantial disassembly, or substantial storage or even packaging of the components during transport. For example, in the U.S. Pat. No. 4,712,167, the light fixtures must be disassembled from the end of the crane during transport because of their fragile nature and because they can not be sufficiently stabilized. This presents the requirement, however, that they be reattached once the truck arrives at the desired location.

Also, improvement is required of the components of such a system because of the wear and tear, environmental factors, and other operational realities which must be dealt with for a mobile lighting system that must be used in varying climates, locations, and weather. For example, the system must be able to work in conditions of precipitation. It also must adequately provide cooling for high power lighting fixtures. This all must be done while also making the components resistent to debris, dirt or moisture experienced while being operated and adjusted (in multiple phases), or during transport.

Additionally, room for improvement needs to be made in the ability to maintain equipment, or replace components, if needed. The goal is to provide a system which one person can drive to the desired location, and then within a matter of a very few minutes erect the lights and provide a lighting pattern desired for the moment or event. The goal also would be to allow the system to be maintained and parts replaced within a matter of minutes, even though the system utilizes complex and heavy duty parts and components.

It can therefore be seen that a real need exists in the art for improvement. A primary object of the present invention is to provide a mobile lighting system which solves or improves over the problems and deficiencies in the art.

Another object of the present invention is to provide a mobile lighting system which is easily transported to the desired location; and once at the location can be easily maneuvered to different locations.

Another object of the present invention is to provide a mobile lighting system which has a wide variety of adjustment features to locate and aim the lighting fixtures once on location.

A still further object of the present invention is to provide a mobile lighting system which can provide high levels of lighting to relatively large areas; and high intensity lighting, as desired.

A still further object of the present invention is to provide a mobile lighting system which can provide high powered, high intensity, wide scale lighting from a relatively small, highly mobile platform.

Another object of the present invention is to provide a mobile lighting system which can be transported for long distances in virtually a ready-to-operate condition.

Another object of the present invention is to provide a mobile lighting system which deters interference by environment or travel with the operation of the lighting components.

A still further object of the present invention is to provide a mobile lighting system which can be elevated tens of feet into the air, or articulated beneath the level of the mobile platform, if desired.

Another object of the present invention is to provide a mobile lighting system which can individually control the aiming and beam pattern issued by each individual lighting fixture.

Another object of the present invention is to provide a mobile lighting system which is entirely self-contained including power, electrical components, cooling system, environmental protection systems, and control systems.

A further object of the present invention is to provide a mobile lighting system which minimizes the amount of labor involved in transport and operation.

Further object of the present invention is to provide a mobile lighting system which allows remote monitoring of operating parameters of the system to insure that it is operating efficiently and correctly.

Another object of the present invention is to provide a mobile lighting system which is efficient, economical, and durable.

These and other objects, features, and advantages of the present invention will become more apparent with reference to the accompanying specification and claims.

SUMMARY OF THE INVENTION

The present invention provides a highly mobile and maneuverable platform which contains all operational components for high power, wide scale, highly controllable lighting. The platform includes electrical power generating means, associated electronic circuitry for operation of one or more light fixtures, control circuitry to operate the system, and all electrical interconnections. All of these components and circuitry are preassembled and shielded from environmental concerns.

A highly articulateable boom means extends from the mobile platform to an array head which is also highly manipulatable. The combination provides for a high degree of flexibility in positioning one or more of the light fixtures, attached to a light rack, which in turn is attached to the boom head. Still further, each of the light fixtures is independently adjustable to pan, tilt, and vary its beam pattern. Individual fixtures can then be used for individual purposes; or combinations of fixtures or all of the fixtures can be used for composite effects.

Cooling systems are provided for both the light fixtures as well as some of the electrical components. Precipitation protection means are provided for cooling systems to allow needed air flow without rain interfering with the operating components.

Easily accessible structures are provided for components that will most frequently have to be serviced or replaced. All of these features contribute to the quick, efficient, and economical advantages of the present invention.

BRIEF DESCRIPTION OF THE DRAWINGS

FIG. 1 is a side elevational view of a preferred embodiment of the present invention showing the boom and light rack in position for transport.

FIG. 2 is a side elevational view similar to FIG. 1, except showing the boom and light rack in an extended and elevated position.

FIG. 3 is a side elevational view similar to FIGS. 1 and 2 but illustrating diagrammatically the articulation flexibility of the boom.

FIG. 4 is an enlarged partial side elevational view of the structure enclosed by line 4—4 in FIG. 3.

FIG. 5 is a still further enlarged top plan view of the top of the boom and lighting array shown in FIG. 4.

FIG. 16 is an enlarged sectional view taken along line 16—16 of FIG. 6.

FIG. 17 is an enlarged sectional view taken along line 17—17 of FIG. 16.

FIG. 23 is a diagrammatic depiction of monitoring system and remote pager system according to the invention.

FIG. 24 is a diagrammatic depiction of a leveling system that can be used with the invention.

DETAILED DESCRIPTION OF THE PREFERRED EMBODIMENT

Figure 6:
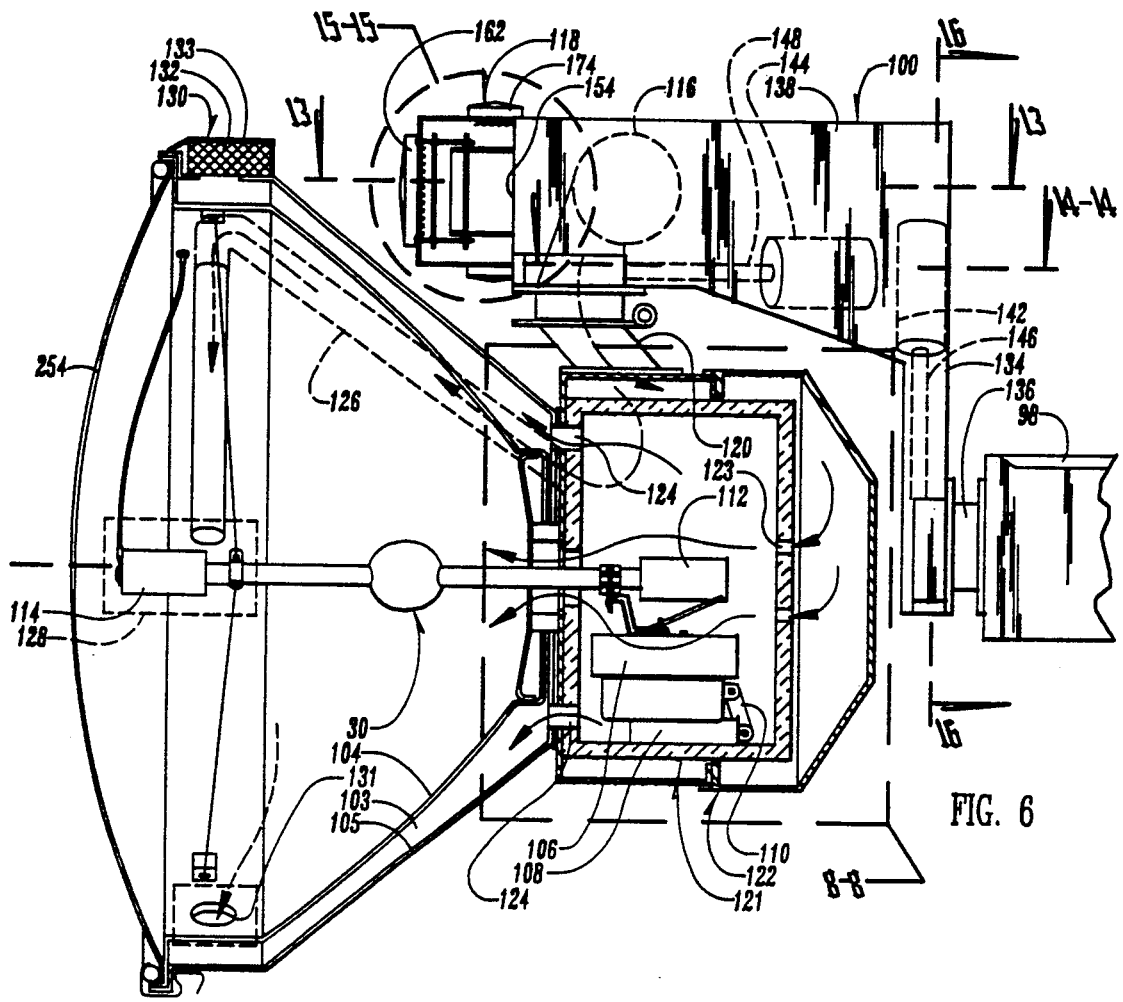
FIG. 6 is a still further enlarged sectional view taken along line 6—6 of FIG. 5.

To assist in a better understanding of the invention, a preferred embodiment of the invention will now be described in detail. It is to be understood that this is a description of but one form the invention can take, and is not inclusive of all such forms.

Reference will be taken to the drawings in this description. Reference numerals are used to indicate specific parts or locations in the drawings. The same reference numerals will be used for the same parts and locations throughout the drawings, unless otherwise noted.

a. Overview

This description will first begin with a general overview of the preferred embodiment. It will concentrate on how the complete system functions to meet the objects of the invention. Thereafter, the specific areas of the system will be focused upon.

FIG. 1 shows mobile lighting system 10. Truck 12 (Ford Cargo 8000—single rear axle) is a diesel powered mobile platform for system 10. Boom 14 (LAOC-51 Model crane from Lift-All, P.O. Box 9738, Fort Wayne, Ind. 46899) is attached approximately over the rear axle on the bed 16 of truck 12. It is powered by hydraulics from PTO or electrical motor driven pump and is highly articulateable, as will be described in detail later.

Boom head 18, attached to the distal end of boom 14, is also maneuverable. In the preferred embodiment, boom head 18 can be rotated approximately 355° with respect to the distal end of boom 14.

Light array 20 is in turn connected to boom head 18 and consists of six luminaire assembly units or light fixtures 22. As will be described in more detail below, each fixture 22 can be panned or tilted with respect to light rack 24, which serves as the mounting frame for fixtures 22. The beam shape or pattern emanating from each fixture 22 can also be adjusted as will be discussed later. It is to be understood that use of the terms light fixture or fixture indicate the light source generally, including reflector, lamp, and mounting means. These terms also do not imply that the structure is "fixed" or immovable when used in association with the invention.

On-board generator 26 is positioned on truck bed 16 generally midway between front and rear axles of truck 12. Generator 26 (Cummins Diesel-powered 60 Kilowatt AC) provides electrical power for operation of the entire system 10.

Ballast box 28 is positioned underneath bed 16 at the rear of truck 12. As will be discussed further, ballast box 28 contains most of the electrical components needed for operation of high-powered lamps 30 (see FIG. 6) for fixtures 22.

Control box 32 is also mounted on bed 16. Box 32 contains much of the control electronic circuitry for the entire system 10. It is to be understood that additional control elements are positioned inside cab 34 of truck 12.

As can be seen, truck 12 is therefore a self-contained mobile lighting combination. It can be driven at highway speeds across country as needed. It also can be easily manipulated even in rather confined areas once on location. The single rear axle cab-over arrangement of truck 12 provides an ability for a short, compact turning radius which is not possible with a double rear axle semi-tractor-type vehicle.

Still further, it can be seen that support arms 36 are carried on bed 16. As is well known in the art, these arms are extended and firmly secured on the ground whenever boom 14 is operated. They serve to stabilize and level truck 12 when boom 14 is operated.

Generator 26 is soundproofed to minimize noise of its internal combustion engine. It provides enough voltage and wattage to power up to six several thousand watt lamps 30, as well as the motors and actuators for boom 14 the boom head 18, and fixtures 22, and any electronic components associated with other circuitry or structure associated with system 10. This relatively small mobile platform of truck 12, therefore, can produce high power, high intensity, wide scale lighting without any connection to any other power source. Boom 14 can be extended up to 60 feet in the air. If all six fixtures 22 are coordinated, the array 20 can produce a light level which is effective over distances of general thousand feet or more. Because the intensity of light diminishes over distances, it is easily understood how very high levels of light can be created when the array is closer to its target area. In fact, the system 10 is capable of producing a simulated "bright-sunlit" day regardless of other existing lighting conditions.

FIG. 1 further depicts how all components for system 10 are pre-assembled and ready to operate. No on-location assembly is required. Essentially, system 10 can be driven to the location, put in position, and then within only several minutes, boom 14 can be extended to any number of different configurations. The operator then can turn any or all of the lights on and control their orientation, if desired.

An important aspect of the embodiment is the ability to transport light fixtures 22, including lamps 30, in operational condition. In other words, these somewhat fragile components, including glass lenses and glass bodies, do not need to be dismounted and being stored in special packing or otherwise encased for protection even when driving down the road.

Still further, it is pointed out that all wiring through the boom into light array 20 is within boom 14 and the structure of boom head 18, and light rack 24. This protects the cabling from the elements and also is a part of the pre-assembly of the invention.

Still further, all of the substantial electronic components, other than actuators for boom 14 and boom head 18, and motors for movement of fixtures 22 and lamps 30, are contained at ground level. In particular, ballast box 28 is slideable on rails from the rear of truck 22 so that it can be easily accessed with respect to capacitors, ballasts, and other significant electrical parts.

System 10 allows complete control of operation of boom 14 and fixtures 22 by remote control 38 (schematically depicted in FIG. 2). Control 38 is hard-wired into control box 32 by cable 40 (which can be several feet to several hundred feet long). This allows the operator (whether it be the truck operator or a lighting director for a movie company, or the like) to stand away from truck 12 and manipulate system 10.

It can therefore be seen that system 10 provides the high flexibility and control needed for mobile lighting purposes, with the added advantage of being self-contained, with a high degree of flexibility and choices.

b. Articulateable Boom

Boom 14 is constructed to be articulateable in several planes. It also has a rotatable base on truck bed 16. A first section 40 extends to a middle joint 42. A second section 44 extends from the joint 42 to a second joint 4 to which is attached boom head 18.

As can be seen, each boom section 40, 44 is extendable longitudinally. This allows the entire boom 14 to be folded up in the position shown in FIG. 1; but then extended up to almost 60 feet in total length.

A joint 48 at the base, and joint 42 at the middle, allow it to be folded back onto itself as shown in FIG. 1. They also allow it to be articulated so that its distal end can reach a majority of positions on the surface of a sphere of 80 feet in diameter as shown in FIG. 3; as well as a majority of positions within that sphere. Of particular interest is the fact that it can be articulated so that the second portion of boom 14 can actually extend downwardly to the point that if desired, light array 20 could be positioned underneath the level of truck 12 (see FIG. 3).

The high degree of articulation available with boom 14 therefore makes the exact positioning of truck 12 less critical. It also provides for extremely broad flexibility to adjust light array 20, even slightly, with a minimum amount of time and effort. As will be discussed in more detail later, each fixture 22 can also be adjusted to project light energy in virtually any direction substantially at any point on or within the sphere described above.

c. Translatable Boom Head 18

Boom head 18 is rotatable by virtue of a pivot member 50 and motor 52 at the distal end 54 of boom 14. It is virtually rotatable 355° which in turn means that the entire light array 20 can be turned almost a complete revolution. Therefore, boom 14 can be easily and quickly operated to move array 20 to any number of different orientations and positions. Then, boom head 18 can be operated to rotate the array 20 as desired.

FIG. 2 illustrates how boom 14 can be extended upwardly. It is to be understood that each general section 40 and 44 of boom 14 can be telescopically extended. Therefore, total length of boom 14, when retracted and then manipulated to the position shown in FIG. 1, is much less than what total length of boom 14 can be when fully extended. This also contributes to the ability of boom 14 to be transported on a smaller size truck 12, yet have a high degree of flexibility by being able to extend very high vertically.

The extension and articulation of boom 14 is controlled by hydraulic cylinders and hydraulic motors, such as are known within the art. It is noted that truck 12 has a single rear axle. Its significant that it allows a higher degree of maneuverability of truck 12, especially in tight places, than a double rear axle vehicle or trailer.

FIG. 2 also schematically shows remote control 38. This remote control allows the operator to have greater vision of operation of boom 14 and manipulation of various fixtures 22 and light rack 24, as well as the lighting effect the system has produced. It is also noted that positioning of generator 26, control box 32, and boom 14 (as well as the other components) is designed to maximize even distribution of weight on truck 12.

FIG. 3 diagrammatically depicts the flexibility of boom 14. With truck 12 in the position shown, base 56 of boom 14 provides a basic reference point. Base 56 pivots 359° around axis 58. First section 40 of boom 14 pivots between horizontal (0°) and 100° as shown at 60. Second section 44 of boom 14 pivots 270° with respect to first section 40 as shown at 62. Still further, light rack 24 pivots 180° on the end of boom 14 as shown at 64.

FIG. 3 therefore depicts that light array 20 can be positioned in a majority of locations in a sphere centered at base 56, with the perimeter of the sphere defined by boom 14 being fully extended along an axis. Obviously, placement of light array 20 in the sphere at a level below truck 12 is limited, but as shown in FIG. 3, such placement is possible to some extent by the appropriate manipulation of boom 14. See for example reference number 20E wherein light array 20 can actually be positioned below level of truck 12. Compare also the position of light array 20 at reference numbers 20A through 20E.

d. Array of Fixtures

By referring to FIGS. 4 and 5, light array 20 is more specifically shown. Light rack 24 has a rather complex shape. It also holds three pairs of fixtures 22 (22A and B, 22C and D, and 22E and F) in offset positions (see FIGS. 4 and 5). Each fixture 22 can be panned about 350° around a pivot axis (see FIG. 5 at 66). They each can also be tilted approximately 220° from that axis (see FIG. 4 at 68). Each fixture therefore can independently be altered in orientation substantially. As previously discussed, this high degree of control allows for exotic and complex composite beam patterns from array 20.

Furthermore, each fixture can emit a variably shaped beam as desired. This further contributes to the flexibility of lighting effects that can be produced with system 10. Each fixture is panned, tilted, and has its beam pattern adjustable by operation of D/C electrical motors and associated gearing. One example of this type of motor and gearing arrangement is found at U.S. Pat. No. 4,712,167.

The distal end 54 of boom 14 has a 180° pivot 70 with respect to boom head 18. A hydraulic cylinder 72 (or electric actuator) with appropriate linkage controls the 180° pivot around pivot 70. As shown in FIG. 5, boom head 18 includes first section 74 and a second section 76. Section 74 and 76 are rotatable with respect to one another around axis 78 to provide 355° rotation of second section 76 with respect to first section 74. A motor and an appropriate gearing, such as is known in the art, is housed within boom head 18 to accomplish this rotational movement. FIG. 5 also shows that second section 76 of boom head 18 is pivotably attached to light rack 24 along a pivot 80. An electric actuator (motion systems) 82 can pivot light rack 24 up to 120° around pivot 80.

The degrees of freedom of movement of these parts of system 10, combined with the freedom of movement of boom 14, combine to provide the high degree of articulation and flexibility for positioning of light array 20.

FIG. 5 shows that light rack 24 has two parallel arms 86 and 88 which have adjacent ends connected to the second section 76 of boom head 18. Arms 86 and 88 are connected at their other end to front bar 90 which is transverse to the arms 86 and 88. Side wing bars 92 and 94 angle back at approximately 45° from front bar 90. A variety of cross bars 96 strengthen and support arms 86 and 88, and bars 90, 92, 94.

FIG. 4 shows that pairs of fixtures 22 are positioned in offset relationships to each other on light rack 24. Mounts 98 A, B, and C are transverse to bars 90, 92, and 94 and space the fixtures of each pair of fixtures 22 approximately equally from rack 24. As shown in FIG. 4, each fixture 22 consists of a base 100 which allows panning and tilting of fixture 22. Bases 100 are rotatably mounted on the mounts 98.

FIG. 5 shows that each pair of fixtures 22 are offset and spaced apart from one another by the angling of wing bars 92 and 94. The spacing is uniform to allow independent panning and tilting of each fixture with respect to one another. It is furthermore to be understood that spacing of the fixtures 22 with regard to each fixture and with regard to each set of pairs, is such that the center of gravity of each fixture of each pair, as well as each pair of fixtures counter balances the other. No matter how the different fixtures 22 are pivoted or rotated, the entire array 20 remains balanced.

As can be seen in FIG. 6, lamps 30 are axially (see axis 102) mounted within substantially parabolic reflectors 104. Lamps 30 are high intensity metal halide lamps (or tungsten/halogen 10,000 watt) of ratings between one and eighteen thousand watts. They produce a tremendous amount of light energy at their light source. The axial mounting of these lamps 30 (particularly 6,000 watt and higher watt lamps) allows the most efficient and effective utilization of the light energy from the light source. Combination of the axial mounting of lamps 30 and the particular shape of the reflectors efficiently utilizes the light energy. A substantial majority of the light energy is radiated radially from about the equator of the spherical bulb portion of the lamp 30 (in other words generally perpendicular from the longitudinal axis of the lamp). The shape of the reflector basically wraps around this projected equator to capture and effectively redirect and control light. This translates into being able to direct a highly controlled but large amount of light energy to a target area, even a substantial distance away. It is noted that lamp 30 can be moved relative to axis 102 by being mounted to carriage 106 which is slid relative to block 108 by linkage 110. A motor (not shown) can control this action. Reference can be taken to U.S. Pat. Nos. 4,729,077 or 4,712,167, incorporated by reference herein, for specific structure for this feature.

A primary problem in utilizing axially mounted HMI lamps in this configuration, is the tremendous heat that is created by the lamp and by then collecting and converging the light energy with a reflector. In particular, the interior of fixtures 22 must be forced-air cooled to allow this configuration to effectively operate. Without cooling, the end seals 112, 114 (and particularly the end seal 114 at the outer end of lamp 30) are susceptible of over heating and failure. In the past, lamps of the type of lamp 30 could not be positioned axially in a reflector. The most vulnerable portions of the lamp are seals 112 and 114. They are the most vulnerable part of the lamp to heat damage. This is why seals 112 and 114 are extended so far away from center portion of the lamp. When mounting the lamp axially, end seal 114 is placed directly in a hot zone created by the light energy emanating from the fixture.

In the preferred embodiment, a pressurized air cooling system is utilized as shown at FIG. 6. It basically consists of a blower fan 116 and a forced air flow system for each fixture 22. The fan is situated in a housing consisting of base 100 attached to the fixture 22. A rain protector air inlet member 118 associated with base 100 allows air in. The air is then forced through conduit 120 into a housing 122 surrounding what is called a hot box 121, which in turn surrounds end seal 112 of lamp 30. Pressurized air from fan 16 then is directed in two paths. First, it passes through apertures 123 in the back of the housing 122. Pressurized cooling air then flows out aperatures 124 into the gap 103 between reflector 104 and outer shroud 105, transporting heat from the hot box reflector and shroud to outlet vents 130 positioned around the outer perimeter edge of the reflector shroud combination.

It is to be understood that hot box 121 serves an important function. It is insulated and isolated from the other components except for apertures 123 and 124. A substantial amount of heat builds up around seal 112. It is important to shield this heat from the components in base 100 such as the ignitor, motors, fan, gears, wiring, etc. Therefore, the hot box 121 keeps as much heat as possible inside its interior and then utilizes the pressurized air to expel such heat out apertures 124 and out vents 130.

In the present invention, a single ended igniter system 261 is used where end 112 of lamp 30 receives a high amount of voltage. Block 106 includes an electrically insulating ceramic piece upon which the lamp is mounted to also electrically isolate the lamp 30 from other components of the system.

Figure 7:
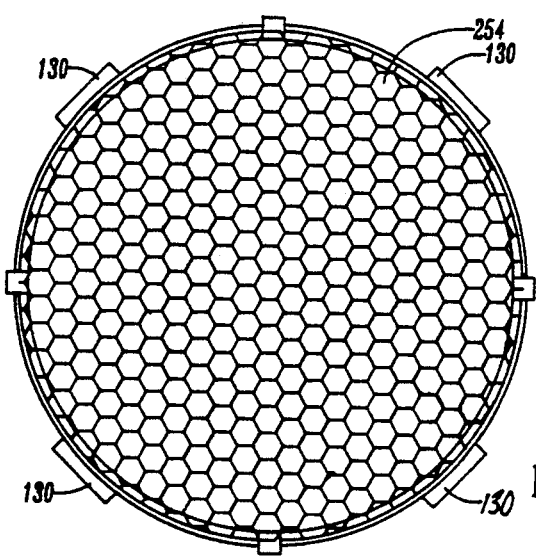
FIG. 7 is a front elevational view of the light fixture FIG. 6.

Front end seal 114, is also very vulnerable to heat because it is placed within the heat stream generated by the reflector 104. It is to be understood that interior of reflector 104 is substantially sealed by virtue of the lens 254 covering its open face. Pressurized cooling air from fan 116 therefore also travels in a second path through conduit 120, into housing 122, and then through an aperture into tube 126 which directs pressurized air directly upon end seal 114. A shield 128 opposite the tube 126 (and surrounding much of seal 114) captures the stream of air to concentrate it on that end seal. Air outlets 131 are then provided around the perimeter of reflector 104 (see FIG. 7) to expel hot air from the interior of reflector 104 out vents 130.

It can therefore be seen that each fixture has a pressurized air cooling system which concentrates fast moving air on both end seals 112 and 114. It is noted that air outlets 130 consist of filters 132 covered by hoods 133, which deter entry of debris or moisture into the interior of reflector 104 by being completely enclosed except for narrow outlet 135.

FIG. 6 also shows in more detailed fashion how fixture 22 can be both panned and tilted. Base 100 has a first arm 134 which is pivotally connected on axle 136 to mount 98. This allows virtually 355° rotation of base 100 around axle 136 for almost complete circle panning. Arm 138 of base 100, generally perpendicular to arm 134, presents axle 140 to which housing 122 is pivotally connected. This arrangement allows basically 220° pivoting or tilting of fixture 22 with regard to axle 140.

In both instances, a motor 142 or 144 is a linear motor attached to a drive shaft 146 or 148; which in turn by gearing well known in the art causes axle 136 or 142 to turn. Both drive systems are enclosed within base 100 to keep them from the elements. As will be described in more detail later, inlet 118 is configured to keep precipitation or debris out of the interior of base 100. Each outlet or vent 130 around the perimeter of reflector 104 has a hood 133. Only small direct openings covered by filter material on the sides of vents 130 exist to shield precipitation or debris from the interior of reflector 104.

An important feature of the present invention is this ability to turn each light fixture 22 in any number of different orientations with respect to the ground. As with any electrical component, moisture is a significant problem. Because system 10 will be used outdoors, it is susceptible to precipitation. The present invention therefore includes air inlet structure for each fixture 22 which allows the air intakes and outlets to work for cooling of each lamp 30, but does not allow precipitation or any sort of moisture to readily flow to vital components of the lamp structure.

The structure for what will be called the rain filter is as follows. Referring to FIG. 6, as well as FIG. 15, air inlet 118 is seen. A square tube 152 is mounted in a mating opening 154 in arm 138 of base 100. It has an outer open end 156. A shroud 158 is mounted on the end of arm 138 of base 100 and surrounds but is spaced apart from tube 152. A screened opening 160 exists the outer end of shroud 158 (see FIG. 15). A canopy 162 (see FIG. 6) can be held above screened opening 160 to prevent precipitation from directly entering screened opening 160.

Bolts and nuts 164 and 166 in each corner of shroud 158 extend inwardly into shroud 158 and hold a first blocking plate 160 between screened opening 160 and opening 154 in tube 152. Plate 168 is larger than opening 154. A second blocking plate or more accurately a blocking ring 170 is secured around the exterior of tube 152. Finally, screened outlets 172 are positioned around the sides of shroud 158 near the junction of shroud 158 and base 100.

Air inlet 118 operates as follows. Canopy 162 blocks debris or precipitation from directly entering screened opening 160. If any precipitation does get around shroud 158, it has to pass through screened opening 160 but then is blocked from opening 154 by blocking plate 168. Therefore, no matter what orientation base 100 is in, precipitation, or debris, can not enter opening 154. This maintains the interior of base 100 free from water. Any water that would enter screened opening 160, would be diverted by blocking plate 168 and then flow around sides of tube 152 and out screened outlets 172. In particular, it is noted that if base 100 is oriented in the position of FIG. 15, gravity would send fluid along the sides of tube 152 and out screened outlets 172. If base 100 is oriented in the position shown in FIG. 6, any fluid which enters screened opening 160 would flow to the bottommost wall of shroud 158 and out screened outlets 172. Additionally, canopies 174 can cover screened outlets 172 (see FIG. 6). Any precipitation which might enter screened outlet 172 in FIG. 6, would flow around tube 152 and out the bottom of screened outlet 172.

Figure 15:
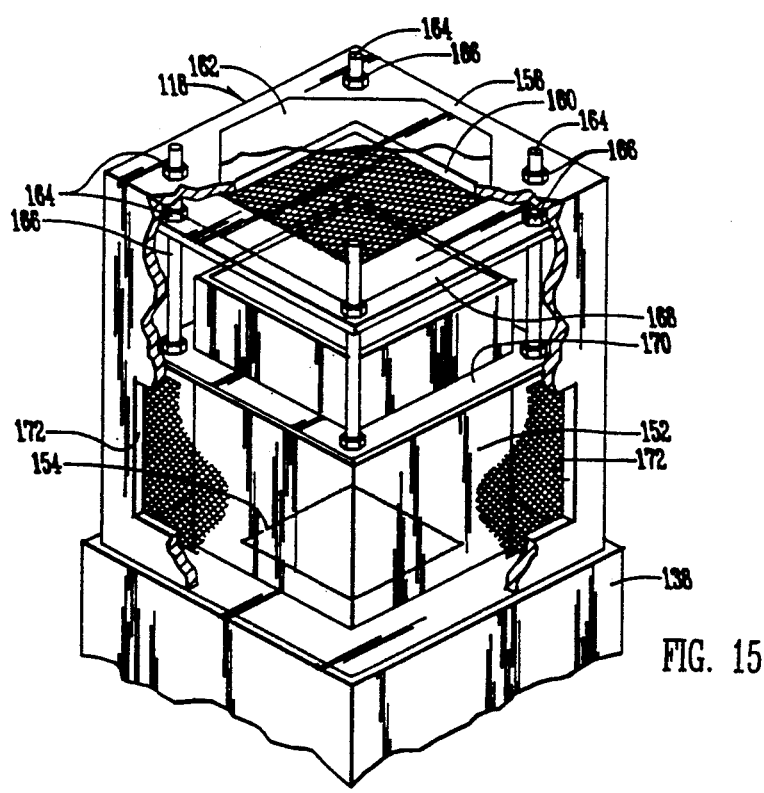
FIG. 15 is an enlarged perspective view of the portion of FIG. 6 contained in line 15—15.

Even if base 100 was oriented so that air inlet 118 was upside down from the position shown in FIG. 15, any fluid which entered screened outlets 172 and flowed to the sides of tube 152, would be blocked by blocking ring 170 to the outside of tube 152 and gravity would take the fluid out of screened opening 160.

FIGS. 8-12 show an additional feature of the present invention. A quick release lamp mount system is provided for each fixture 22. This allows the elimination of having to untighten or tighten bolts to remove or install lamp 30. Instead lamp 30 can be removed and a new lamp substituted in a matter of seconds.

Figure 8:
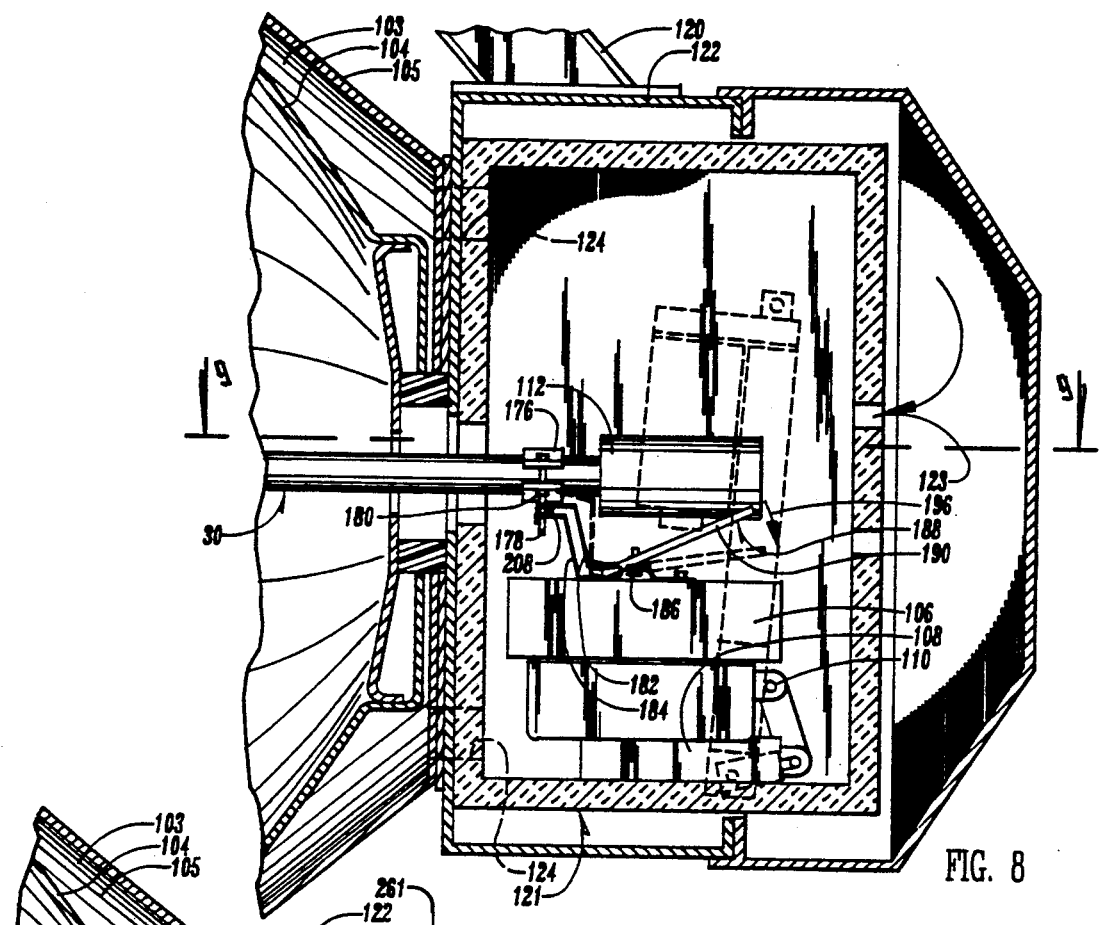
FIG. 8 is an enlarged sectional view taken along line 8—8 of FIG. 6.

In FIG. 8 it can be seen that a two piece clamp 176 surrounds one end of lamp 30. Bolts 178 and nuts 180 hold the two pieces of the clamp in position. The outer end of bolts 178 are generally utilized in conventional structures to secure lamp 30 to a mounting block to hold lamp 30 securely in place. It requires a substantial amount of effort and time to tighten or un-tighten bolts 178 if lamp 30 needs to be replaced. This is particularly problematic in situations where the provision of light from fixtures is critical, and any down time must be minimized with respect to replacement of lamps 30.

Figure 9:
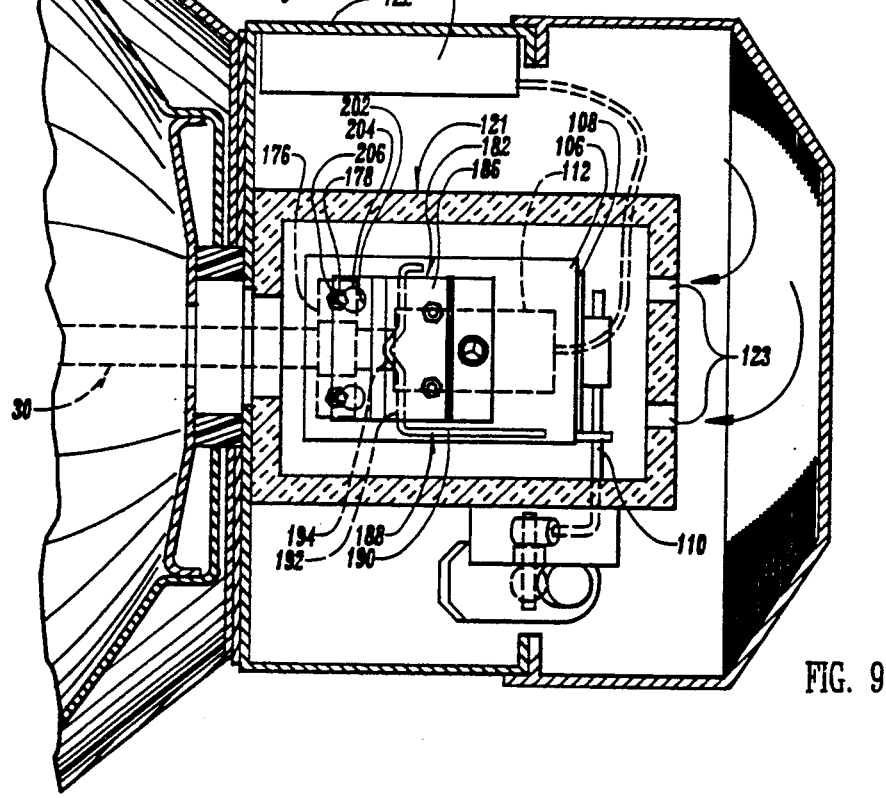
FIG. 9 is a sectional view taken along line 9—9 of FIG. 8.
Figure 10:
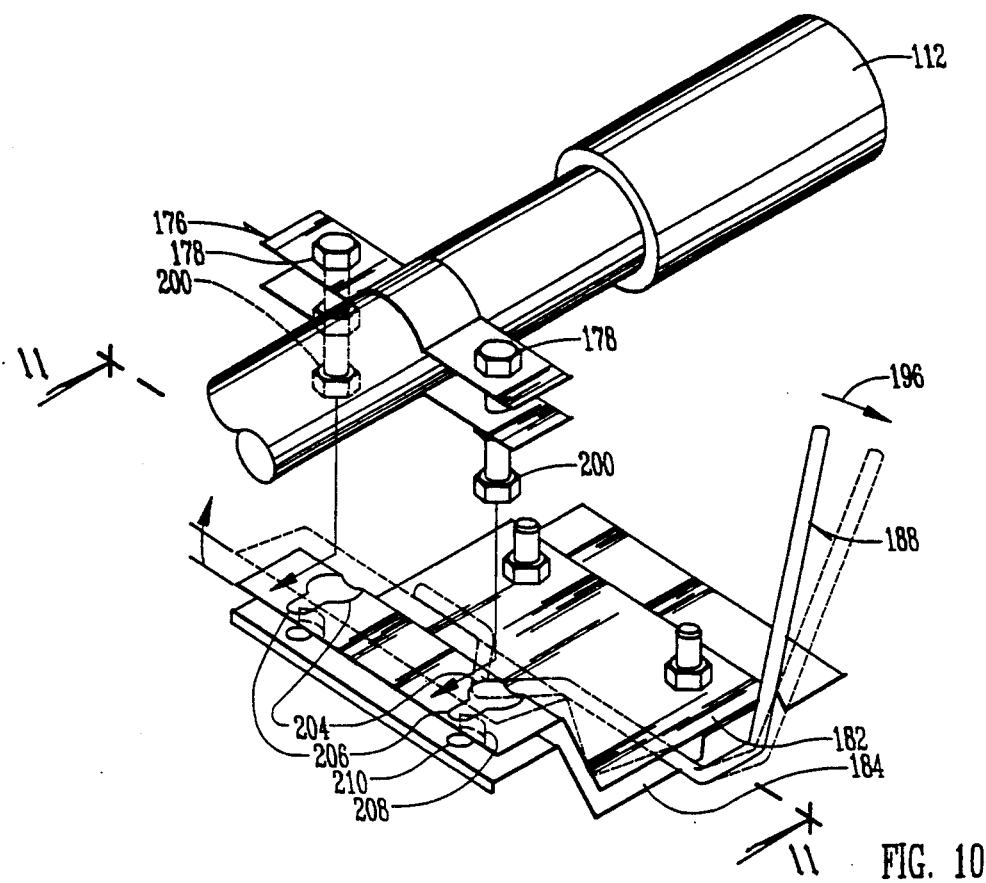
FIG. 10 is an isolated perspective view of the structure shown in line 8—8 of FIG. 6.
Figure 12:
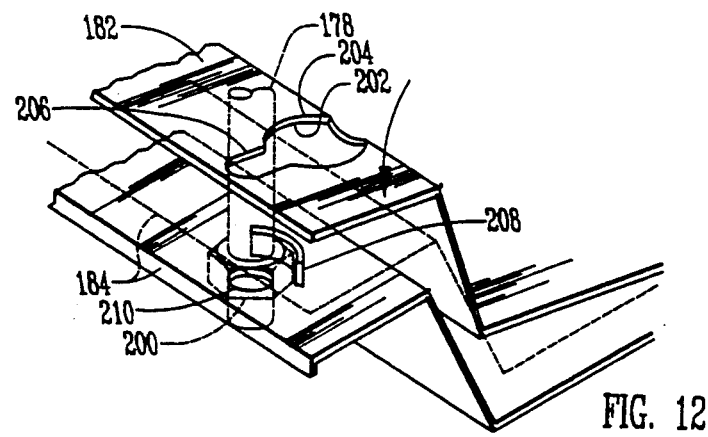
FIG. 12 is an enlarged partial perspective view of FIG. 10, showing jaws of the lamp mounting means in an open position.

FIG. 8 shows that instead of bolting lamp 30 down to a mounting block, bolts 178, on opposite sides of lamp 30 extend down and are retained by jaws 182 and 184 of the quick mount system. Jaw 182 overlays jaw 184 but is connected at flat portion 186 of jaw 184. The outer ends of jaws 182 and 184 are free. Jaw 184 is then secured by bolts to carriage 106. A release lever 188, has a handle 190 which is perpendicular to bent portion 192. Bent portion 192 includes a V-shaped middle positioned between jaws 182 and 184. By pushing lever 188, in the direction of arrow 196 (in FIGS. 8 and 10) V-shaped portion 194 would urge jaw 182 upward. Jaw 182 is made of spring steel or other resilient material, causing separation of the outer ends of jaws 182 and 184 from one another but biasing jaw 182 towards jaw '84 FIGS. 8-10 show the jaws in a closed position; FIG. 12 shows jaws in an open position.

Figure 11:
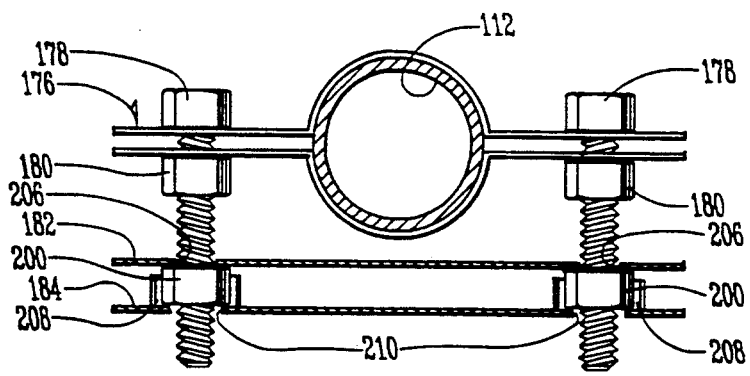
FIG. 11 is an enlarged sectional view taken along line 11—11 of FIG. 10.

FIG. 11 shows clamp 176, bolts 178, and nuts 180. Nuts 200 are additionally threaded unto bolts 178. FIG. 10 shows that slots 202 exist in upper jaw 182. Slots 202 have a first portion of a width larger in diameter than nuts 200 and then a second portion 206 which is only slightly larger than the diameter of bolts 178 and smaller in diameter than nuts 200.

To insert lamp 30 into the quick release system of the invention, lever 188 is pushed in the direction of arrow 196 to raise jaw 182 to the position of FIG. 12. Nuts 200 of bolts 178 are vertically inserted into the first portions 204 of slots 202 and then moved forward into the second portions 206 of slots 202. As shown in FIG. 12, curved retaining walls 208 are positioned behind apertures 210 and lower jaw 184. The ends of bolts 178 are then vertically placed down into apertures 210. Lever 188 is released allowing the resilience of jaw 182 to close jaw 182 unto jaw 184, locking bolts 178 and nuts 200 into apertures 210 and retaining walls 208.

To quickly release and remove lamp 30, a reverse procedure is utilized.

e. Power and Electrical Support Circuitry For Operation of Fixtures 22 Contains Advantageous Features As mentioned, the cabling for all components of system 10 is all pre-connected and protected from the environment. The generator 26 is onboard and soundproofed. All controls are prewired and environmentally protected.

Figure 21:
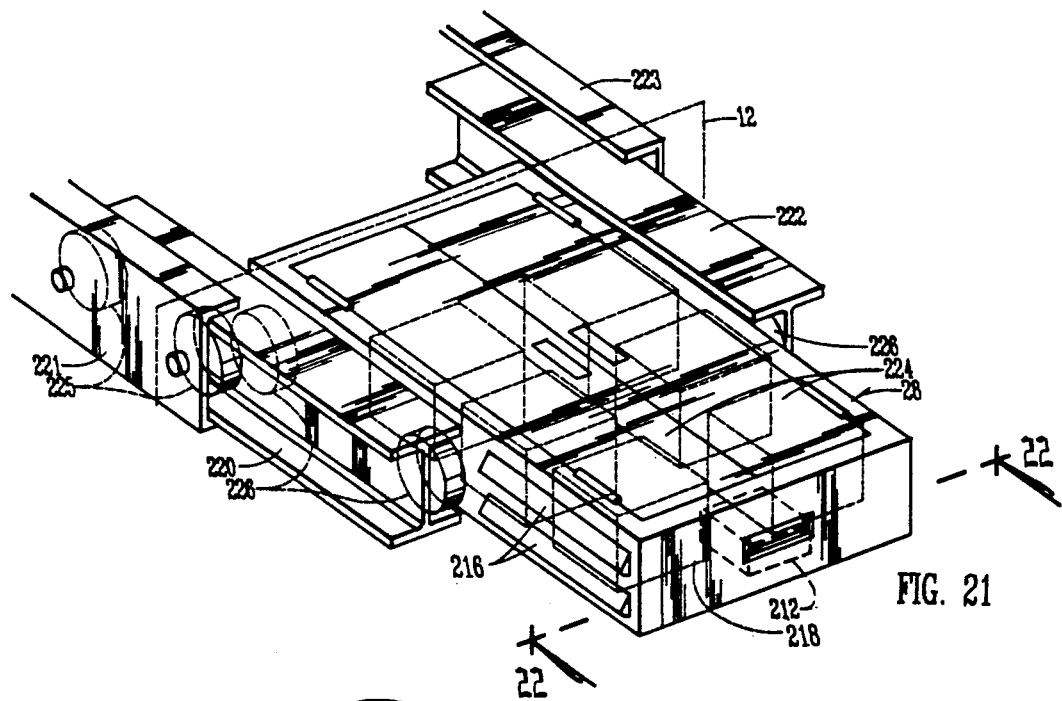
FIG. 21 is a simplified perspective view of the rear of vehicle of FIG. 1, illustrating slideable ballast box.
Figure 22:
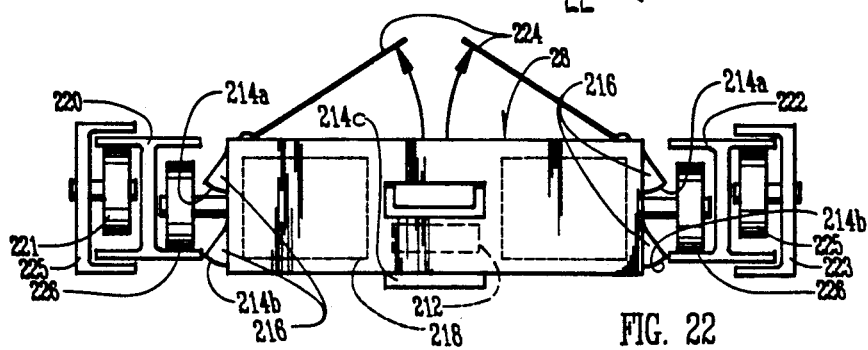
FIG. 22 is an isolated elevation of view taken along line 22—22 of FIG. 21.

A particularly advantageous feature is the provision of ballast box 28 on slide rails at the rear of truck 12. As can be seen in FIGS. 21 and 22, ballast box 28 is carried underneath bed 16 and is protected in that position. The structure of box 28 is such that it protects the components from the environment. Ballast box 28 includes fans 212 which circulate cooling air through the box 28 when operating. During transportation, vents (depicted schematically at 214 A–C) are sealed off by either slideable doors (or hinged doors) 216. On location those vents 214 are opened allowing air input and/or output. Note that vents 214 A and B, have hinged doors that serve as awnings to prevent dropping from the underside of truck 12 to enter box 28.

As shown in highly simplified fashion at FIGS. 21 and 22, ballast box 28 is slideable upon rails 220 and 222 from a concealed position inside truck 12, to an extended position (shown by dashed lines). As shown in FIG. 22, doors 224 would allow access to ballast 218 and other electrical components such as fans 212 inside ballast box 28 when needed. This is much more convenient for maintenance purposes than if the ballasts are individually mounted on the fixtures at the top of the boom. Moreover, it allows better weight distribution with respect to the vehicle, in addition to providing more room on truck bed 16.

Box 28 can be slideable by means known within the art, and in this embodiment, rollers 226 are utilized with respect to I-beam shape rails 220 and 222. Sliding of box 28 works just like many cabinet or file drawers. I-beams 220, 222 slide on rollers with respect to truck frame rails 221, 223 on rollers 225 (two per side) as box 28 is being pulled at. Movement of I-beams 220, 222 stages when they are extended about one-half the length of box 28 from the rear of truck 12. Box 28 can then be further rolled out on rollers 227 to almost its full length. I-beams 220, 222 serve to support the weight of box 28, similar to a file box drawer arrangement. When put in position shown in FIG. 21, a locking beam or brace can be secured to the back of truck 12 against the ends of rails 220 and 222 to protect box 28 from sliding out, or from damage if rear of truck 12 is struck against an object or by another object.

f. Miscellaneous Features

The remote control shown schematically at FIG. 2 allows the operator to control boom head 18 and the individual movement and beam pattern from each individual fixture 22. Reference can be taken to U.S. Pat. No. 4,712,167 with respect to such remote controls.

The preferred embodiment also utilizes a remote pager which can be carried by the operator. FIG. 23 schematically portrays the remote pager system. The remote pager 228 receives continuous signals from the control box 32 or controls in cab 34 of truck 12. If an operational parameter of system 10 exceeds a given operation range, a radio transmitter 230 will send an alarm signal to the pager 228. For example, in the preferred embodiment, transducers 232 of the operation of generator 26 are monitored. When generator 26 operates within acceptable ranges, the radio transmitter 230 is dormant. However, if it goes out of range it sends a signal to warning lights 231. The transmitter 230 also receives the signal and transmits an alarm signal to pager 228. This would inform the operator to check the controls. Such a system is extremely helpful in the following situation, as an example.

Movies are made by passing film at a given frame per second rate past an aperture optically connected to the camera lens. If, for example, a turn of the century wagon, with large spoke wheels, is being filmed, the frequency of the light from lamps 30 must be coordinated with the speed of the film so that a strobe affect is avoided. Therefore, the operator of system 10 works with the film and lighting director to insure this correlation is set. If, however, generator operation changes unexpectedly it could change the frequency output of the lights enough to throw off any correlation between frequency of the lights and frequency of film speed. The pager system therefore would immediately notify the operator of such a problem and allow it to be corrected. At a minimum, it would allow the operator to inform the lighting director that a frequency "out of range" condition had occurred. It is to be understood that in preferred embodiment, other parameters can be monitored. For example, with respect to generator 26, water temperature, oil pressure, over speed, and over current could additionally be monitored by appropriate transducers such as are known in the art, and such as are already installed on generator used in the preferred embodiment. Generator used in the preferred embodiment also has a series of components that operate a warning light and on the generator if any of these parameters exceed desirable limits. In the preferred embodiment therefore, radio transmitter 230 would simply be connected to the wiring that goes to the warning lights. If any warning light is energized, it will in turn instruct the radio transmitter 230 to issue a warning signal over radio waves to portable receiver 228, which in turn alarms or notifies the operator who is carrying receiver 228 of the conditions. All of these components can be put together by off the shelf products in conjunction with the existing generator. It is important to understand that value of such a system is substantial with the present invention. The present invention allows the operator to move several hundred feet away from truck 12 with the remote control. Because of the nature of wide skill lighting, the operator may even be required to move even farther away. Present invention allows all matters of system 10 to be controlled by one operator. This has the substantial advantage over prior art systems which require more than one operator. Many times conventional systems require a worker to run and monitor the generator, a worker to control the crane, and then one or more workers to install and adjust the lamps and light fixtures. The type of wide scale lighting allowed by the present invention, a single operator sometimes has to go even a farther distance from truck 12. The remote paging system that allows the operator to do this with the ability to be notified if any conditions on the truck 12 exist. The operator can therefore immediately return and correct the problem, or at least know that the situation exists.

Figure 13:
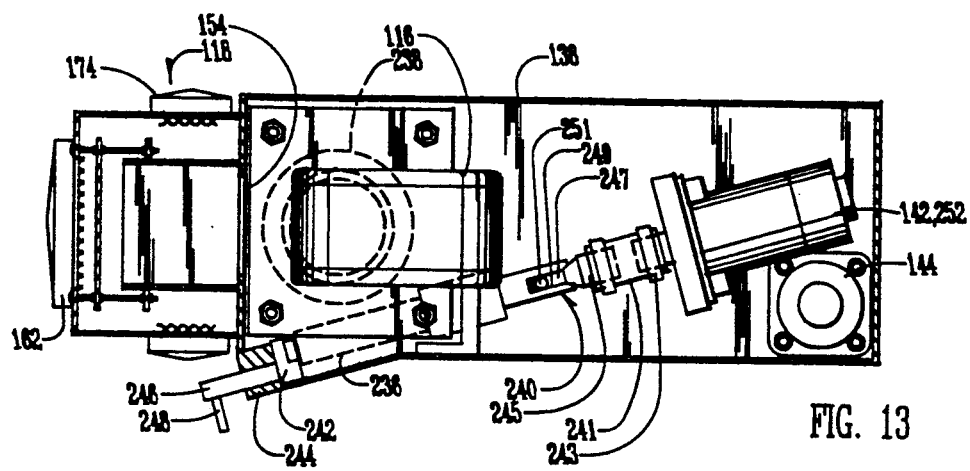
FIG. 13 is an enlarged sectional view taken along line 13—13 of FIG. 6.

FIGS. 13, 14, 16, 17 depict an additional feature of the present invention. As discussed with respect to FIG. 6, actuators and drive shafts are utilized to pan and tilt each fixture 22. This requires basically a rack and pinion arrangement to translate rotation of the small diameter drive shaft to a larger diameter pinion gear. It also requires that the rack and pinion be kept in to secure engagement. It has been found, however, that for a variety of reasons it is necessary or desirable to be able to disengage the drive system to allow manual moving of a fixture 22 or to allow removal of the actuator. In the preferred embodiment, referring to FIGS. 13 and 14, this type of quick release system is depicted. FIG. 13 shows a motor 142 and a drive shaft 146 which rotates in response to operation of 142. A rack 236 exists along shaft 146 and is operably engaged to pinion gear 238. Rotation of shaft 146 translates into rotation movement of pivot pinion 238.

Figure 14:
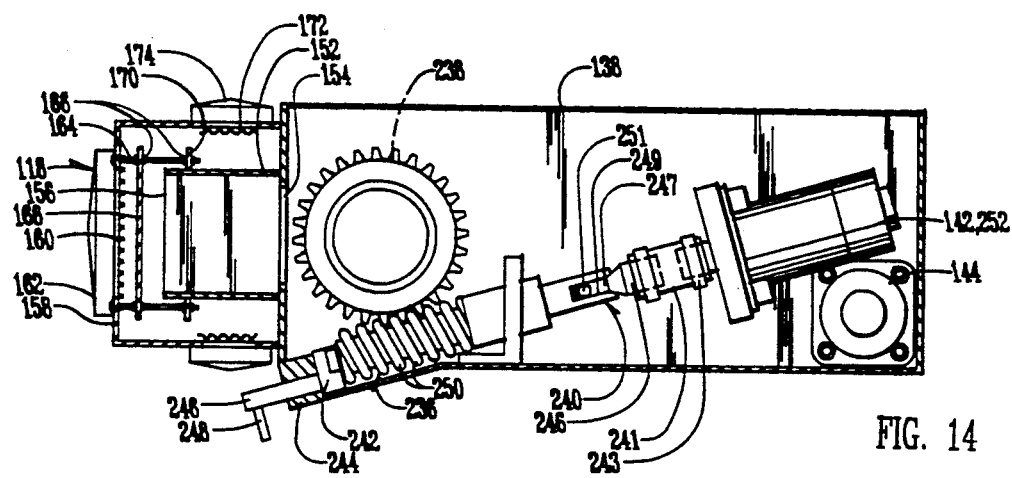
FIG. 14 is an enlarged sectional view taken along line 14—14 of FIG. 6.

FIG. 14 shows that shaft 146 has a universal joint 240 (such as is known in the art) disposed along its length between motor 142 and rack 236. The preferred embodiment universal joint 240 simply consists of resilient rubber tube 241 bridging a gap between portions of shaft 146. Tube 241 is secured to opposite shaft portions by clamps 243. This universal joint 240 therefore allows the portion 245 of shaft 146 to be pivoted to an extent in any direction from the axis of shaft 146. It is further noted in FIG. 14 that tanged end 247 is madeably secured into slot 249 and adjacent portions of shaft 146. A spring loaded detente ball 250 intanged end 247 holds it in slot 249. However, tanged end 247 can be easily removed from slot 249 by pulling tanged end 247 in a direction out of the side of slot 249 (for example, perpendicularly out of the page in FIG. 14). This allows motor 250 to be quickly disengaged for maintenance or replacement. The very outer end of shaft 146 is rotatably mounted in an acentric cam 24. Cam 242 is rotatable within the housing 244 of base 100. An extension 246 passes through housing 244 to a control handle 248 on the exterior of housing 244. It is noted that in the preferred embodiment, rack 236 is actually comprised of a coil spring 250 surrounding shaft 146.

FIG. 16 shows that the same arrangement including a motor 144, drive shaft 148, and a rack pinion 236 and 238 exists for tilting of a fixture 22. FIG. 14 shows the arrangement for panning of fixture 22.

FIG. 17 illustrates that when control handle 248 is rotated, extension 246 causes ecentric cam 242 to turn. This results in displacement of the rack 236 of drive shaft 146 or 148 to disengage rack 236 from pinion 238. The arrangement is biased so that normally rack 236 is urged against pinion 238. However, if handle 248 is turned far enough, rack 236 will be held away from pinion 238. Therefore, pinion and rack 238 and 236 are normally engaged which serves to lock fixtures 22 from movement. However, if it is desired to manually move fixtures 22, handles 248 are turned to separate the rack opinion and allow free panning or tilting of fixture 22.

Figure 18:
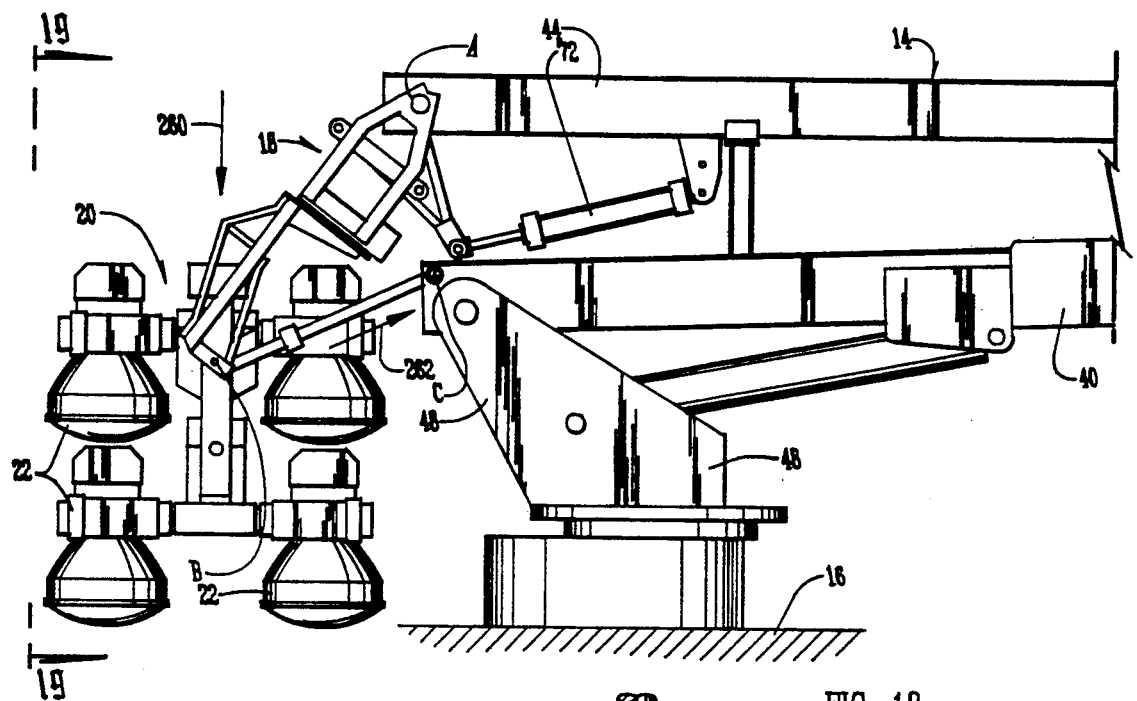
FIG. 18 is a partial side elevational view of the boom, light rack, and light fixtures in position for transport.
Figure 19:
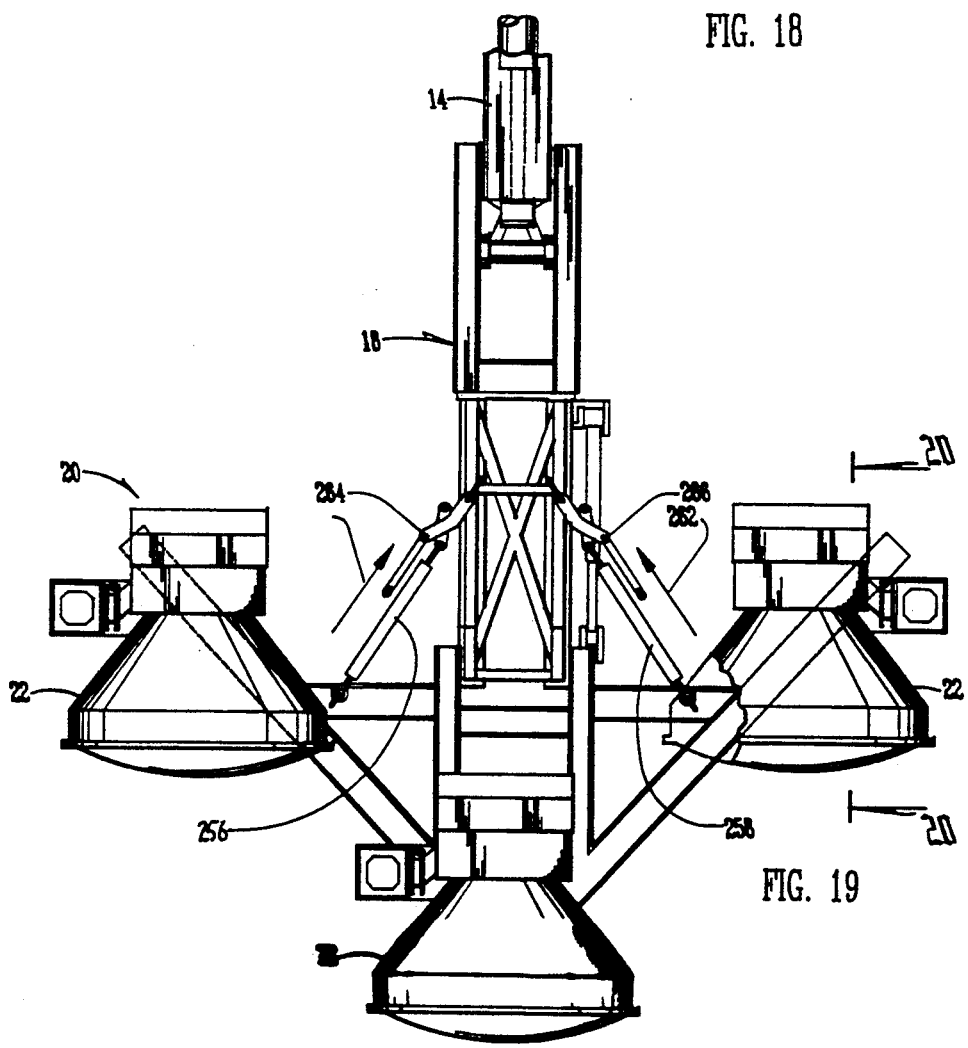
FIG. 19 is a front elevational view taken along line 19—19 of FIG. 18.
Figure 20:
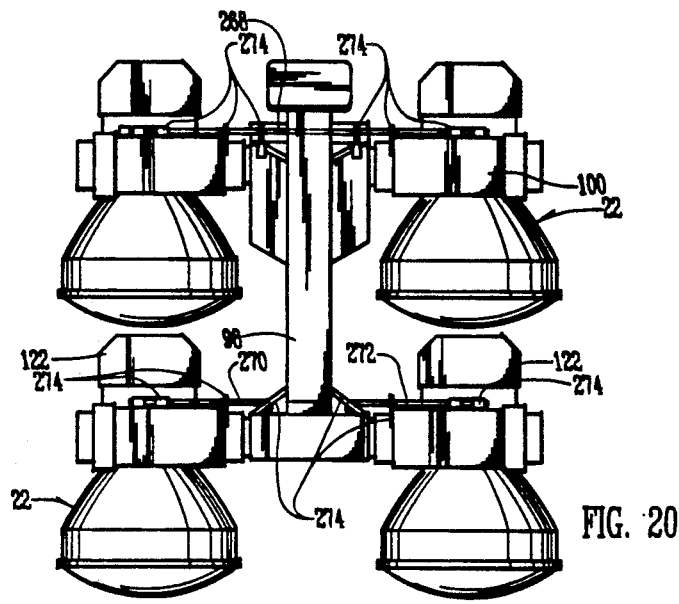
FIG. 20 is a side elevational view taken along line 20—20 of FIG. 19.

FIGS. 18-20 illustrate another feature of the present invention. A primary advantage of the invention is the ability to transport the entire system 10 in an assembled, ready to go form down the highway. Although all the components are assembled to be able to withstand the demands for such a system, some components, especially light fixtures 22 and lamps 30 (along with glass reflector lenses 254) are somewhat fragile. Normally, lighting fixtures of this type need to be disassembled and protectively packed or stored during transport. As shown in FIG. 18 (for also FIG. 1) however, boom 14 can be articulated to position light array 20 over the rear of bed 16 of truck 12 during transport. Additionally, each of the fixtures 22 can be oriented downwardly.

As previously mentioned, the fixtures are balanced on light rack 24 so that center of gravity and therefore much of the stress and strain is concentrated on light rack 24. Additionally, in the transport position, boom head 18 is angled downwardly from the end of boom 14 so that light rack 24 is below the end of boom 14. If any maintenance needs to be done on fixtures 22, they are then easily accessible. They are also, therefore in a position to be effectively transported.

However, to further secure and stabilize light array 20 in a rigid position, and to minimize vibration or forces that would damage array 20, removable braces 256 and 258 are secured between light rack 24 and joint 48 of boom 14 near base of boom 14. Essentially this configuration forms a triangle between the end of boom 14 (see letter A in FIG. 18), attachment of brace 156 to light rack 24 (letter B in FIG. 18) and the attachment of brace 256 at or near joint 48 of boom 14 (letter C). The weight of the entire array 20 presents a force downward in the direction of arrow 260. Because it is pivotable with respect to boom head 18 and the outer end of boom 14, this creates a force in the direction of arrows 262 which establishes a high degree of stability for the system. Any bumps or jarings experienced by truck 12 or boom 14 along the highway will then cause these forces to provide even more stability to minimize any vibrations or forces which would tend to vibrate or jar light array 20 or fixtures 22 during transport.

In the preferred embodiment, braces 256 and 258 are bars having over-center clamps 264 and 266 to rigidly draw the components together.

FIG. 20 shows that rods 268, 270, and 272 can also be utilized to hold fixtures 22 into position during transport. Ears 274 can be positioned along components on light array 20 in a line with aligned apertures. Rods 268, 270, 272 can then be inserted through those ears and secured into position by bolts. These rods therefore help ensure that forces experienced during transport will not excessively jar the motors and gearings utilized for panning and tilting of fixtures 22.

Single End Ignitor

The single end ignitor system 261 of the present invention enhances the present invention because it allows for a portable articulateable fixture. Ignitor systems for arc lamps are well known within the art. Generally, high voltage wires of substantial size must be communicated with both ends of a lamp 30 to provide substantial voltages at those ends. The problems with this arrangement are that these wires (sometimes requiring up to 3 inches in clearance) take up a lot of room in the fixture as well as must be protected from the heat and electrically isolated and insulted from other components.

The present invention utilizes a single end ignitor 261 having the electrical ignitor component mounted in the base 100, which is away from the heat and outside hot box 121. Ignitor is electrically communicated with end 112 of lamp 30 and provides approximately 277 volts to that end. This is sufficient to ignite arc lamp 30. It is safer than other prior art systems which utilize up to 30,000 volts. It also eliminates the large cable required to end 114 of lamp 30.

Leveling Indicators

Another feature of the invention is the utilization of leveling indicators to tell the operator if parts of system 10 are level with respect to horizontal. As shown in simplified and schematic fashion in FIG. 24. Two Mercury switches 280, 282 are positioned on the top of each of the four support legs 36 for truck 12. The mercury switches indicate when the top of each of those legs is horizontally level. The operator then can easily determine if the entire truck 12 (and particularly bed 16) is horizontally level.

Operation and structure of these type of switches can be seen in commonly owned U.S. Pat. No. 5,012,398 by inventor Jones, et al. entitled "Light Bar Leveler", which is incorporated by reference herein. Each switch is calibrated to close an electrical connection when it is horixantally level. Each switch can be connected to an indicator panel 288 which will energize a light 290, 292 showing whether the mercury 284, 286 in a particular switch is horizontal or not. A panel can then given this indication for each of the mercury switches to allow the operator to control adjustment of legs 36 until everything is horizontally level. Additionally, the switches can be oriented perpendicularly to indicate leveling in two directions.

Moreover, these type of mercury switches can be included at other positions on truck 12. For example, mercury switches could be positioned on light rack 24, or boom head 18. By connecting the switches to a control panel such as previously discussed, the operator would be able to see if each of those components were horizontally level or not. A primary advantage would therefore be to allow the operator to see not only if those features were horizontal, but to be able to immediately see the relative orientation of one part of system 10 to the other.

Independent Light Array

It is to be understood that the preferred embodiment has been discussed utilizing light array 20 in association with boom 14 and truck 12. It should be appreciated that array 20, including light rack 24, and perhaps even structure similar to boom head 18, could be independently utilized by other elevating structure. For example, array 20 could be suspended from an elevated beam in a theater. Electronic cabling could then be directed down to a control panel and to an electrical power source. The remote control or other control could then be used to operate array 20 and its individual fixtures 22.

PARTS LIST

Following is informamation on some of the components used in the preferred embodiment.

Igniter 261 is available from L. P. Associates, Inc., 6650 Lexington Ave., Hollywood, Cal. 90038, under model number 4675X. The igniter is a single end igniter operable from 208 Volts AC provided by the generator. It can provide a 50,000 Volt electrical charge to ignite the gap between electrodes and the arc lamp 30.

Generator 26, and associated equipment, is available from Cummins-Onan of Golden Valley, Minn., under product number 60DTR2-L/30481.

The actuator which powers the movement of carriage 106 to move lamp 30 in fixture 22 is available from Warner Electric, 449 Gardner St., South Beloit, Ill. 61080, under model number S12-17A8-01.

The motor which rotates boom head 18 is available from W. W. Granger, Des Moines, Iowa, under Dayton Electric Mfg. product number 2Z800D. The actuators to pan and kilt light fixtures 22 are available from W. W. Granger, under product number 4Z835. The blower or fan 116 for the cooling system for fixture 22 is available from W. W. Granger, under model number 4C761. Fans 212 for ballast box 28 are available from W. W. Granger, under product number 4C549.

The motor actuator that tilts light rack 24, 120 degrees is available from Motion Systems Corporation, Box 11, Shrewsburg, N.J. 07701, under model number 85151 and is a 500 pound loading, 12 inch stroke device.

The actuator to tilt the boom base 180 degrees is available from Motions Systems Corporation, under model 85559 and is rated at 1,500 pounds with a 24 inch stroke.

It is to be understood that the angles of rotation or movement of the various components of system 10 are given as general estimates and in actuality may vary a few degrees.

It will be appreciated that the present invention can take many forms and embodiments. The true essence and spirit of this invention are defined in the appended claims, and it is not intended that embodiment of the invention presented herein should limit the scope thereof.

What is claimed is:

1. A mobile lighting system which can be transported in operational form comprising:
   a mobile platform means;
   an articulateable, rotatable, and extendable boom means mounted on the platform means;
   a boom head means mounted on the boom means for providing pivoting and rotational movement between the boom head and the boom means;
   a light fixture rack means pivotally attached to the boom head means;
   light fixture mounting means attached to the rack means for mounting light fixtures and allowing panning and tilting of each fixture;
   one or more light fixtures each including a lamp means and a reflecting means, each fixture being attached to said mounting means;
   power generators means mounted on the platform means for producing mechanical power available for adjustable movement of the boom means, boom head means, light fixture rack, light fixture mounting means, and light fixtures, and electrical power for the lamps;
   ballast means mounted on the platform for providing ballast to the lamps;
   variable beam means associated with each light fixture for providing a variable beam pattern for each light fixture;
   cooling means for providing air flow to the fixtures and lamps to cool at least a portion of the fixtures and lamps during operation; and
   control means mounted on the platform for operating and controlling the system.

2. The platform means of claim 1 comprising a truck means including a truck bed.

3. The system of claim 2 wherein the truck means is a single rear axle truck.

4. The system of claim 1 wherein the boom means is a multi-segment arm having one or more joints, the arm being extendable, rotatable, and bendable.

5. The system of claim 1 wherein the boom means has an end which can be articulated to a majority of positions within substantially a sphere surrounding the mobile platform means including positions around and beneath the level of the platform means.

6. The system of claim 1 wherein the boom head means is rotatable in almost a complete circle.

7. The system of claim 1 wherein the rack means comprises a frame to which can be mounted a plurality of light fixtures each of which can be panned or tilted without interference with any other fixture.

8. The system of claim 1 wherein the mounting means for the light fixtures comprises a yoke means allowing rotation of the fixture in first and second planes.

9. The system of claim 8 wherein the mounting means allows rotation in the first plane of approximately 360°.

10. The system of claim 8 wherein the mounting means allows rotation of the fixture in a second plane generally 220°.

11. The system of claim 1 wherein the lamp means is elongated along an axis and is axially positioned along the axis in a generally parabolic shaped reflector means.

12. The system of claim 1 wherein the generator means is a fuel powered generator producing standard voltage levels.

13. The system of claim 1 wherein the ballast means includes a housing containing ballasts, the housing being slideably mounted to the mobile platform means so that it can be moved to a position where the interior of the housing can be inspected.

14. The system of claim 1 wherein the variable beam means comprises a lamp which is movable with respect to a reflector to alter the beam shape emanating from the reflector.

15. The system of claim 1 wherein the cooling means comprises a housing attached to a light fixture, the housing having an air inlet and outlet and closing a fan means, the fan means drawing air through the inlet and directing the air into a conduit which is directed on at least a portion of the lamp in the fixture.

16. The system of claim 1 wherein the control means includes electronic control and monitoring components which allows supervision of and instructions to the system.

17. The system of claim 1 wherein the control means includes a hand-held control panel means electrically communicated to the mobile platform means which allows an operator to control the system.

18. The system of claim 1 further comprising a leveling means for determining electrically whether the platform means is level.

19. The system of claim 1 further comprising an isolation means for the lamp means, the isolation means including an insulated housing surrounding an end of the lamp means to retain heat generated by that end of the lamp means to protect other components associated with the light fixture.

20. The system of claim 1 further comprising a single end ignitor means for igniting the lamp means, the single ended ignitor being positioned in the light fixture mounting means.

21. A mobile lighting system allowing quick transport and setup, easy maneuverability and manipulatibility, and flexible operation and control, comprising:
a boom connected to a mobile self-powered platform;
a boom base for the boom, rotatable around a first vertical axis;
a boom arm having a first section extending between the boom base and a first joint, and second section extending between the first joint and the second joint;
a boom head means attached to the second joint, the first and second sections extendable along second and third axes, the first and second joints allowing pivotal translation of the first and second sections and the head;
boom head being rotatably approximately 355° around the end of the boom arm around a fourth axis;
a light rack attached to the boom head, the light rack moving correspondingly with the rotatably boom head;
fixture mounts connected between the light rack and light fixtures, allowing pivoting of the light fixtures with respect to fifth and sixth axes; and
the combination allowing multiple degrees of freedom of movement of the fixtures, allowing them to be placed in a variety of orientations, substantially any where within a large spherical zone defined in part by the length of the boom fully extended.

22. The system of claim 21 wherein the light fixtures contained relatively high wattage lamps.

23. The system of claim 22 wherein the lamps are in the range of 1,000 to 18,000 watt lamps.

24. The system of claim 21 wherein the platform comprises a single rear axle flatbed truck of medium size.

25. The system of claim 21 wherein the boom arm has an extended length of several tens of feet.

26. The system of claim 21 further comprising generator means mounted on the platform.

27. The system of claim 21 further comprising electrical power means, electrical control means, ballast means, and motor means all contained on or in association with the platform.

28. A mobile lighting system comprising:
a mobile base means;
an extendable, articulateable crane means mounted on the base means;
a light rack connected to the end of the crane means, the rack having a connection means to the crane means, and a frame means, the connection means providing generally 355° rotation to the light rack, and the frame means including a front bar having opposite ends and two side wing bars extending obtusely from opposite ends of the front bar and diverging from each other; and
fixture mounts on the front bar of the frame means, and additional fixture mounts towards distal ends of the side wing bars to space apart and offset the fixture mounts from each other.

29. The system of claim 28 wherein the frame means is centered and balanced with respect to the connection means to the crane means to facilitate balancing of the frame means in any rotational or orientation with respect to the end of the crane means.

30. The system of claim 28 wherein the fixture mounts are spaced apart to balance any fixtures mounted to the frame means regardless of the orientation of the frame means or fixtures.

31. The system of claim 28 wherein the fixture mounts comprise yoke means allowing pivoting of a fixture in at least two different directions, and includes actuators and motors to manipulate the yoke means.

32. The system of claim 28 further comprising cooling means associated with each fixture attached on a fixture mount to cool the interior of the fixture.

33. The system of claim 28 further comprising a fixture mounted to a fixture mount, a reflector connected to the fixture mount, and a lamp mounted to the fixture mount and enclosed substantially by the reflector.

34. A mobile lighting system comprising:
a mobile base means;
an extendable and articulateable crane means connected to the base means;
a light rack means connected to the end of the crane means;
fixture mounts on the light rack means for attachment of light fixtures;
motor means associated with the light fixtures for panning and tilting of each fixture;
the motor means including a drive shaft connected to a motor;
a gear having an axle connected to the fixture mount;
a pinion detachably connected to the drive shaft and associated with the gear to translate rotational movement from the drive shaft to the gear;
a cam means operatively connected to the axle; and
the drive shaft pivotable with respect to the pinion to disconnect the drive shaft from the pinion, the pinion having bias means to lock the pinion in position when the drive shaft is pivoted away from the pinion to prevent movement of the fixture when the drive shaft is disconnected, the cam having a handle which can be manually moved to manually turn the fixture axle and move the fixture.

35. A mobile lighting system comprising:
a mobile base;
an extendable, articulateable crane;
a light rack at the end of the crane;
ballast means mounted on the mobile base, the ballast means comprising a containing box, sealable air vents on the containing box, a fan within the containing box to cool the contents of the box;
ballasts for lights on the light rack, and track means associated with the mobile base and the containing box to allow the containing box to be slideably moved with respect to the mobile base to allow access to the containing box, and securement means on the mobile base for securing the retaining box positioned with respect to the mobile base within a frame supporting the mobile base.

36. A mobile lighting system comprising:
a mobile base;
an extendable, articulateable crane;
a light rack attached to the end of the crane;
an on-board generator means producing power over a range of frequencies;
a frequency monitor means for monitoring actual frequency of the generator means;
a desired frequency means to set a desired frequency for the generator means;
comparative means for determining if the actual and desired frequencies are sufficiently close to one another;
transmitter means for transmitting a signal if the desired frequencies are not sufficiently close; and
receiving means to issue a signal that the actual and desired frequencies are not sufficiently close.

37. The system of claim 36 wherein the receiving means signal is taken from the set comprising audible, visual and tactile signals.

38. A method of mobile lighting comprising:
placing an articulateable and extendable boom with a plurality of pivotable joints upon the bed of a single rear axle truck means;
placing electrical power generating means and control means on the truck means;
attaching an articulateable boom head to the end of the boom means;
attaching a light rack to the articulateable boom head;
attaching light fixture mounting means at spaced apart locations on the light rack, including means to pan and tilt each individual fixture;
including ballast means on the truck mans; and
transporting the entire preassembled, ready to operate components of the system to a lighting location with the light fixtures attached to the boom during transport and utilizing the generating means to facilitate operation of the boom means, boom head means, panning and tilting means, and operation of lamps in the fixtures to provide ready to light mobile lighting.

* * * * *